(12) United States Patent
Howard

(10) Patent No.: US 7,674,163 B2
(45) Date of Patent: Mar. 9, 2010

(54) FILLET BOARD FOR USE WITH FISH HAVING HORNS

(76) Inventor: Michael R. Howard, W7406 Koshkonong Lake Rd., Fort Atkinson, WI (US) 53538

( * ) Notice: Subject to any disclaimer, the term of this patent is extended or adjusted under 35 U.S.C. 154(b) by 232 days.

(21) Appl. No.: 10/927,685

(22) Filed: Aug. 27, 2004

(65) Prior Publication Data
US 2006/0046631 A1 Mar. 2, 2006

(51) Int. Cl.
*A22C 25/06* (2006.01)
*A22C 25/08* (2006.01)
(52) U.S. Cl. ...................... 452/195; 452/194
(58) Field of Classification Search ............... 452/185, 452/194, 195, 196
See application file for complete search history.

(56) References Cited

U.S. PATENT DOCUMENTS

| | | | | |
|---|---|---|---|---|
| 867,182 A * | 9/1907 | Bahde | .................. | 452/166 |
| 926,582 A * | 6/1909 | Meredith | ................ | 452/195 |
| 2,725,592 A * | 12/1955 | Pieper | ................... | 452/195 |
| 2,756,457 A | 7/1956 | Banowetz, Sr. | | |
| 2,795,814 A | 6/1957 | Gaultney | | |
| 2,825,928 A * | 3/1958 | Thornton | ............... | 452/137 |
| 2,838,787 A * | 6/1958 | Hickey | .................. | 452/195 |
| 3,016,565 A | 1/1962 | Hill | | |
| 3,237,240 A | 3/1966 | Bednar et al. | ........... | 452/195 |
| 3,248,751 A * | 5/1966 | Wilborn | ................. | 452/195 |
| 3,445,885 A * | 5/1969 | Reitz | ..................... | 452/195 |
| 3,713,188 A | 1/1973 | Holladay | | |
| 3,727,269 A * | 4/1973 | Snead | .................... | 452/196 |
| 3,740,794 A * | 6/1973 | Smith | .................... | 452/195 |
| 3,757,386 A * | 9/1973 | Murray | .................. | 452/195 |
| 3,785,008 A * | 1/1974 | Parker | ................... | 452/195 |
| 3,833,967 A * | 9/1974 | Kieser | ................... | 452/195 |
| 3,878,586 A | 4/1975 | Hoppert et al. | | |
| 3,908,231 A | 9/1975 | Price et al. | | |
| 4,030,164 A | 6/1977 | Fick | | |
| 4,271,624 A * | 6/1981 | Peluso | ................... | 43/54.1 |
| 4,454,630 A | 6/1984 | Shouldis | | |
| 4,793,027 A * | 12/1988 | Blight | ................... | 452/185 |
| 4,794,670 A * | 1/1989 | Savastano, Jr. | ........... | 452/149 |
| 5,098,338 A * | 3/1992 | Jensen | ................... | 452/194 |
| 5,116,279 A | 5/1992 | Perry | | |
| 5,236,387 A * | 8/1993 | Simon | ................... | 452/194 |
| D352,427 S | 11/1994 | Burd | | |
| 5,522,765 A * | 6/1996 | Dotson et al. | ........... | 452/196 |
| 6,123,615 A * | 9/2000 | Reber | ................... | 452/161 |
| 6,942,562 B2 * | 9/2005 | Kallas | ................... | 452/195 |
| 2005/0009462 A1 * | 1/2005 | Mickelson | .............. | 452/173 |

FOREIGN PATENT DOCUMENTS

JP    2000-224953    *   8/2000

* cited by examiner

*Primary Examiner*—David J Parsley
(74) *Attorney, Agent, or Firm*—Lathrop & Clark LLP

(57) ABSTRACT

A fillet board for filleting fish having spines or horns on their pectoral fins extending outwardly from the sides of the fish body. The board defines apertures each sized to receive the horn of a fish laid flat on one side with the horn secured by the board. A plurality of apertures are sized and spaced along a portion of the length of the board to accommodate fish of different sizes. The fillet board has a spacer element to elevate the board above a supporting surface to provide clearance for fish horns to extend below the board. The fillet board includes a tail clamp for securing the tail of a fish.

6 Claims, 4 Drawing Sheets

FILLET BOARD FOR USE WITH FISH HAVING HORNS

BACKGROUND OF THE INVENTION

1. Field of the Invention

This invention relates to a fillet board for fish.

2. Related Art

Virtually all fish, after being caught, require some method of making the edible flesh available to eat. One of the most desirable ways to provide fish meat is as a fillet in which the larger longitudinal, or side, portions of the fish meat are excised from the body, providing fish meat that is free of bones and skin. While filleting a fish is one of the most desirable ways to prepare fish, not all fish are as easily filleted as others. For example, bullhead and catfish possess spines on their pectoral and dorsal fins, commonly referred to as horns. Bullhead and catfish horns are extremely stiff and sharp and in some species of catfish are venomous. The presence of horns requires careful handling of the bullhead and particularly catfish and makes filleting such fish quite difficult, as the size and stiffness of the horns make it difficult to lay the fish flat on its side to fillet the fish.

There are a variety of fillet boards available that attempt to make filleting fish easier; however, Such fillet boards are not easily usable with fish having horns. One such fillet board is described in U.S. Pat. No. 5,116,279 to Perry. Perry discloses a folding fillet board, which is essentially a portable platform having a central clamp for the fish's tail and a movable hook to aid in hands-free removal of the carcass. Another fillet board devised to aid in fish filleting is illustrated in U.S. Pat. No. 4,030,164, to Fick, which describes a fillet board with a serrated oval opening so that the fish's gill flap or operculum fits within the opening, holding the fish to the fillet board and providing a flat surface for filleting the fish. U.S. Pat. No. 3,878,586 to Hoppert et al. discloses a catfish cleaning board. Hoppert et al. avoid the problem of fish horns by securing the fish on its belly for cleaning, a position that makes filleting a fish very difficult.

SUMMARY OF DISCLOSED EMBODIMENTS

While these known fillet boards aid in filleting of fish, neither is suggestive of or teaches the use of a device for accommodating the filleting of a fish having horns.

This invention provides a fillet board that accommodates the horns of a fish.

This invention separately provides a fillet board usable with fish having horns that has apertures running along at least a portion of the fillet board through which the fish's horns can extend.

This invention separately provides a fillet board supported on legs providing space beneath the board to accommodate fish horns extending through the at least one aperture.

This invention separately provides a fillet board that secures the tail of the fish to the fillet board This invention separately provides a fillet board having a fastening structure that secures the tail of the fish to the fillet board.

The invention separately provides a fillet board that secures the body of the fish to the fillet board.

The invention separately provides a fillet board having a fastening structure that secures the body to the fillet board.

The invention separately provides a fillet board having a repositionable strap that secures the body of the fish to the fillet board.

The invention separately provides a fillet board having a first fastening structure and a second fastening structure that secure the tail and body of the fish to the board.

This invention separately provides a fillet board having a clamp that secures the tail of a fish and a repositionable strap that secures body of the fish to the fillet board.

This invention separately provides an extendable fillet board.

This invention separately provides an extendable fillet board usable with fish having pectoral-fin spines or horns.

This invention separately provides an extendable fillet board that has apertures at least along a portion of its length.

This invention separately provides an extendable fillet board that provides a fastening structure that secures the tail of the fish to the fillet board and/or a fastening structure that secures the body of the fish to the fillet board.

In various exemplary embodiments, a fillet board according to this invention has a series of holes, extending at least partially along the fillet board, that are of sufficient size to receive the fish horn. In various exemplary embodiments, the holes are located along a centerline of the fillet board. In use, the horn of a catfish, a bullhead or other fish having horns extends through the apertures, allowing the fish to lie flat on the fillet board such that the horn of the opposite pectoral fin projects upward providing a grip for use by the fisherman in filleting the exposed, first side of the fish. After the first side of the fish is filleted, the fish is turned over and the fish horn of the filleted side is inserted through the aperture to allow the second side to be filleted.

In various exemplary embodiments, the fillet board has a clamp located at one end of the fillet board. The clamp can be used to secure the tail of the fish to the fillet board. In various other exemplary embodiments, the fillet board has a strap that can extend around the fillet board. The strap can be used to secure the fish's body, or any other desired portion of the fish, to the fillet board. In various exemplary embodiments, the strap can be moved along the fillet board.

In various exemplary embodiments, the fillet board is extendable and has a primary portion and an extension portion, such that the extendable fillet board can be used to support a fish that is larger than the primary portion of the fillet board. When used for a fish having, horns, the extendable fillet board is opened at the hinges to provide an extended fish Support surface. The spine or horn of the pectoral fin is passed through one of the apertures appropriate to the size of the fish Such that the tail is positioned to be secured by the clamp at about the back of the primary portion of the fillet board. When this exemplary embodiment is used for a fish that does not have horns, the tail of the fish is secured at about the back end of the primary portion of the fillet board by a clamp, and a strap extending from a repositionable clip on the extendable portion secures the body of the fish. In various exemplary embodiments, the strap is designed to fit around the fillet board and a fish lying on top of the fillet board. In various exemplary embodiments, the extension portion is connected to the primary portion by one or more hinges attaching the bottom front of the primary portion to the bottom back of the extension portion. In this exemplary embodiment, the extendable fillet board is more compact for storage with the board portions folded at the hinges. In this exemplary embodiment, when the extendable fillet board is folded at the hinges, the apertures in the primary and extension portion are in register such that the folded extendable fillet board can accommodate smaller fish without opening the board to its extended length.

These and other features and advantages of various exemplary embodiments of systems and methods according to this invention are described in, or are apparent from, the following detailed description of various exemplary embodiments of the systems and methods according to this invention.

BRIEF DESCRIPTION OF THE DRAWINGS

Various exemplary embodiments of the structures according to this invention will be described in detail, with reference to the following figures, wherein.

DETAILED DESCRIPTION OF EXEMPLARY EMBODIMENTS

While there is no shortage of different types of fillet boards, none has been specifically structured for use with fish such as catfish and bullhead having pectoral-fin spines or horns. The following detailed description describes exemplary embodiments for a fillet board useful in securing and filleting fish such as catfish and bullhead having horns. However, it is noted that the fillet board described herein also provides a strap that may secure a fish to the fillet board whereby the fillet board is equally advantageously useful to secure and fillet fish that do not have spines on their pectoral fins.

Figure 1:
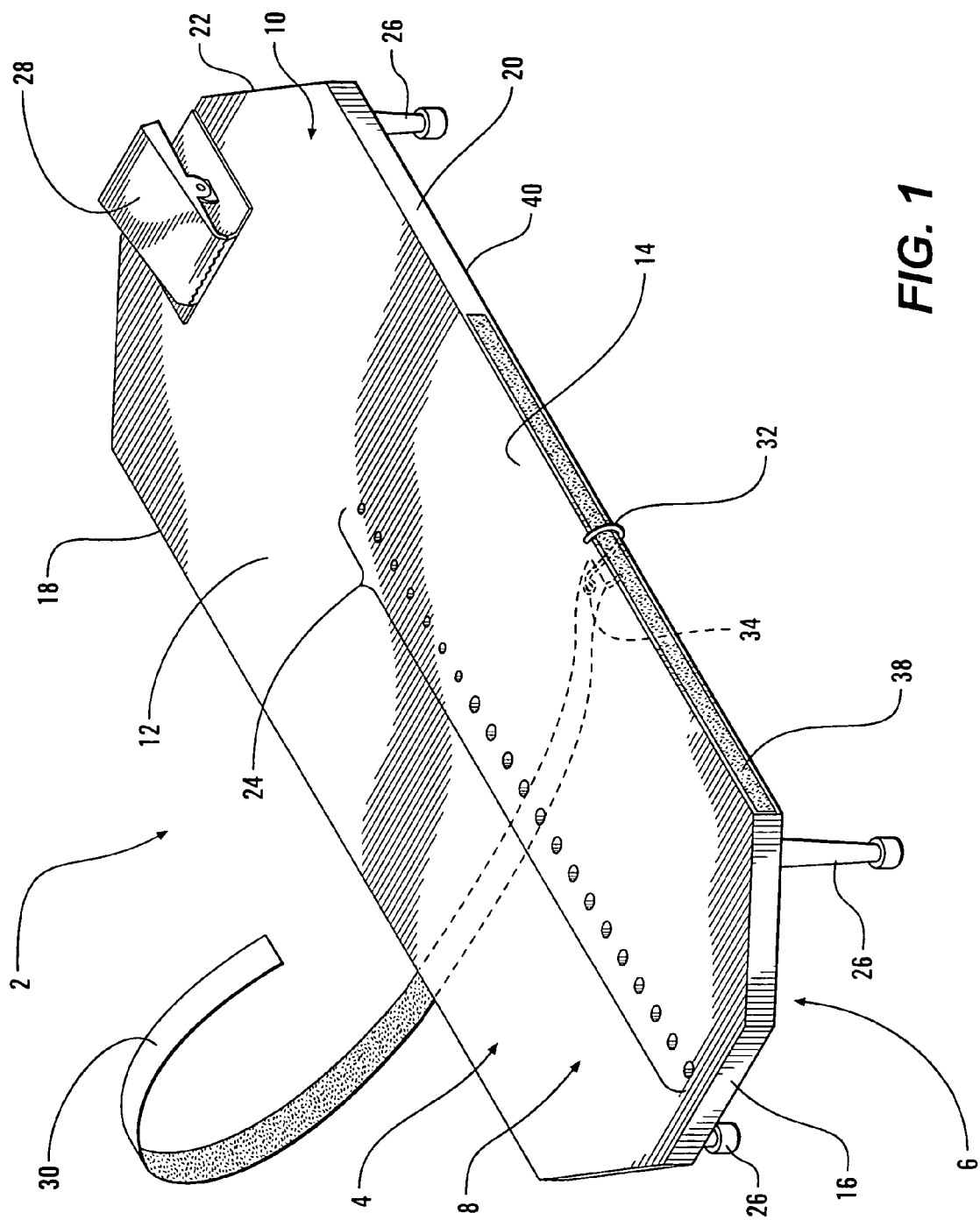
FIG. 1 is a perspective view of a first exemplary embodiment of a fillet board according to this invention.

FIG. 1 is a perspective view of one exemplary embodiment of a fillet board 2. As shown in FIG. 1, the fillet board 2 is roughly rectangular in shape, having a top surface 4 and a bottom surface 6 (not shown). In various exemplary embodiments, the fillet board 2 can have a length of approximately 30 inches, a width of about 11 inches and a thickness of about 0.75 inches. However, it should be appreciated that the board can be any dimension that is sufficient for the size of the fish to be filleted. For example, for fish which are only about two to four pounds in size a smaller board would be sufficient, as compared to a larger fillet board for use with fish that are twenty or more pounds in size. In a various exemplary embodiments, the fillet board is made of wood. However, the fillet board can be made of any suitable planar material, such as plastic, fiberglass, resin, metal or the like. As shown in FIG. 1, the fillet board has a front end 8, a back end 10, a right side 12, a left side 14, with a front edge 16, a right side edge 18, a left side edge 20 and a back edge 22. As shown in FIG. 1, in some exemplary embodiments, the fillet board 2 can be tapered at the front end 8 and/or the back end 10.

In various exemplary embodiments, the fillet board 2 has a row of apertures 24, passing completely through the fillet board 2 and running at least along a portion of the length of the fillet board for receiving the horns of the fish to be filleted. The apertures are spaced about 1 inch on center, and are located along a centerline of the fillet board 2. In some exemplary embodiments, the centerline apertures are graduated in size, with larger apertures toward the front end 8 of the fillet board 2 and smaller size apertures toward the back end 10 of the fillet board 2. It should be appreciated that, in some exemplary embodiments, the apertures 24 may not be directly on the centerline but may be offset. The apertures 24 receive the horns of the fish and allow the fish to lay flat on the top surface 4 and also effectively secure the head-end of the fish to the front end 8 of the top surface 4 during the filleting process. In addition, as smaller fish, such as bullhead, tend to have smaller horns, while bigger fish, such as catfish, tend to have bigger horns, the apertures 24 closer to the back end 10 may be smaller in diameter than those closer to the front end 8. In the exemplary embodiment shown in FIG. 1, the first seven apertures 24 closest to the back end 10 of the fillet board are approximately ¼ inch in diameter, while the rest of the apertures 24 are approximately ⅜ inch in diameter.

The exemplary embodiment of the fillet board 2 shown in FIG. 1 also has spacing elements comprising four legs 26 about three inches in length for supporting the fillet board 2 above an underlying surface, thereby providing space beneath the board to accommodate the stiff horns of a catfish which can project through the apertures and allowing the fish to lie flat on the surface 4. The legs 26 are attached to the bottom surface 6 of the fillet board 2 approximately at each corner. It should be appreciated that any spacing elements can be used such as runners, flanges or the like, so long as they support the member above the underlying support surface so as to provide room for the fish horns to project through the apertures 24. However, it should be appreciated that when legs are used, the legs 26 can be attached at any useful location on the fillet board 2.

Figure 2:
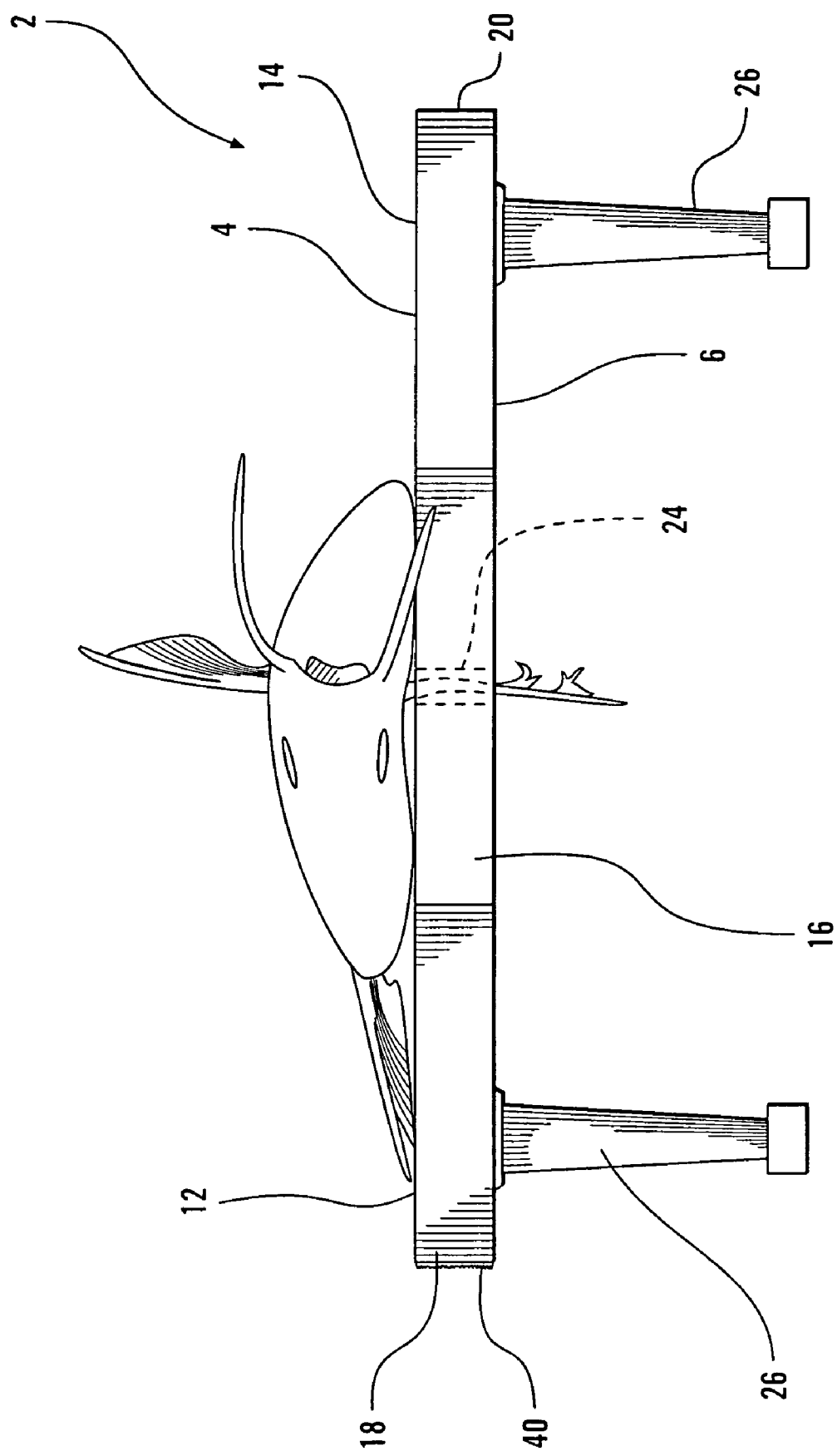
FIG. 2 is an end view of one exemplary embodiment of the fillet board of FIG. 1 or FIG. 4 illustrating a fish horn engaged in a centerline aperture used to secure the fish to the fillet board.

The exemplary embodiment of the fillet board 2 shown in FIG. 1 also has a first fastening structure 28 usable to secure the tail of the fish and a second fastening structure 30 usable to secure the body of the fish. In the exemplary embodiments shown in FIGS. 1 and 4, the first fastening structure 28 is a spring, clamp. When the fillet board 2 is used to fillet a fish having horns, as shown in FIG. 2, the fish is placed on the fillet board 2 at a place appropriate for the size of the fish such that when the fish horn is inserted in an appropriate aperture the tail can be securely fastened in the spring clamp 28. In this exemplary embodiment, the engaged horn acts to secure the body of the fish on the fillet board 2. When the fillet board 2 is used to fillet fish not having horns, such as walleye, bass or pike, the tail is first secured by the spring clamp 28 and the body may be advantageously secured under or about the gills with the body strap 30.

Figure 3:
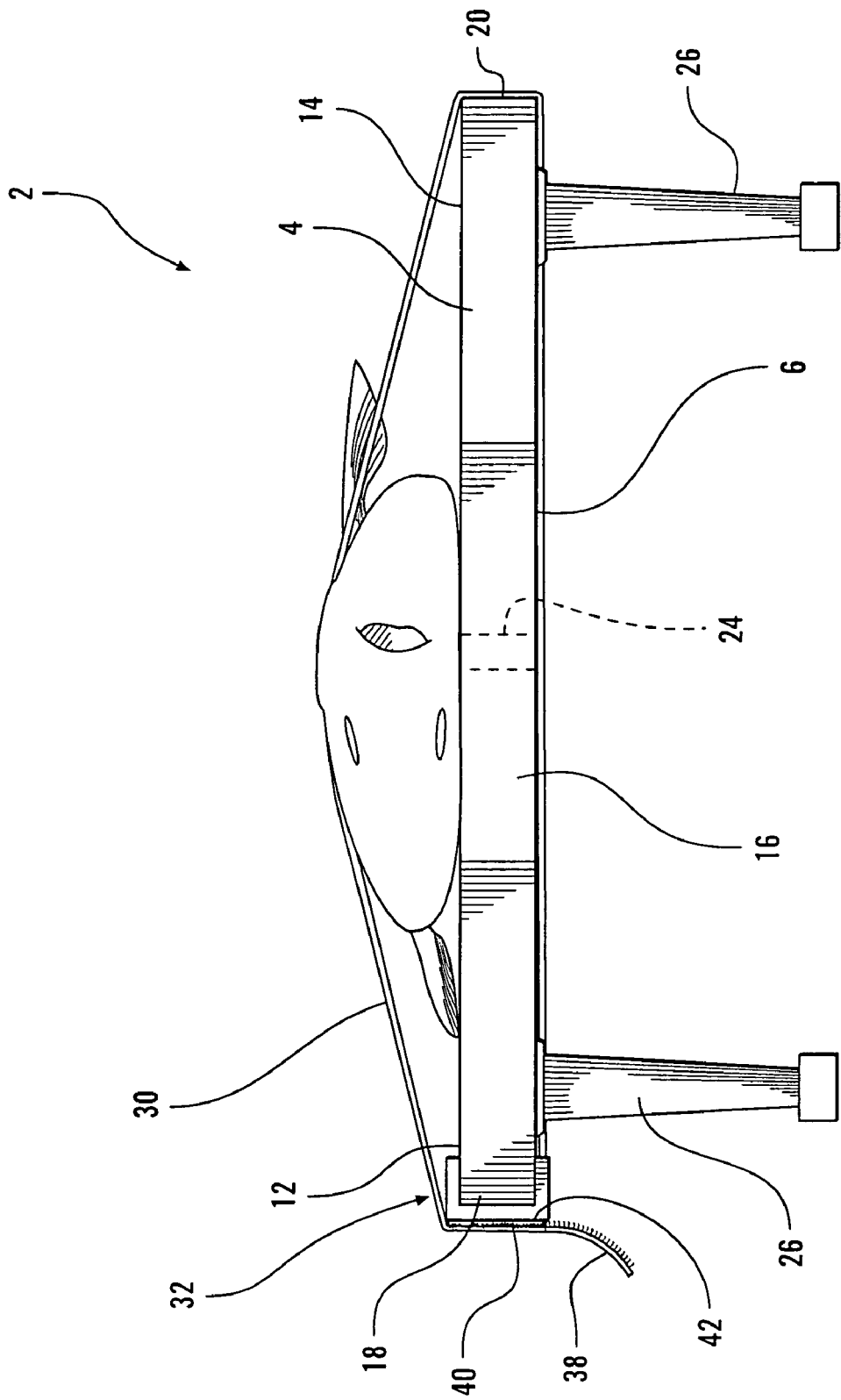
FIG. 3 is an end view of one exemplary embodiment of the fillet board of FIG. 1 or FIG. 4 illustrating a strap used to secure the fish to the fillet board.

In various exemplary embodiments, the body strap 30, as shown in FIGS. 1 and 3, is attached to the fillet board 2 by a clip 32, which is designed and configured to fit over the edge 18 or 20 of the fillet board 2. In various exemplary embodiments, the clip 32 is also designed and configured to be movable or repositionable along the edge 18 or 20 as needed. In addition, while in the exemplary embodiment shown in FIGS. 1 and 4, the tail fastening structure is a spring clamp, it should be appreciated that the tail fastening structure can be any convenient device or structure usable to secure the fish to the fillet board, such as a hinged-clip having spikes or studs, a studded strap or the like.

FIG. 1 shows one exemplary embodiment of the body strap 30 used to secure the body of a fish that does not have horns to the fillet board 2. In this embodiment, the strap 30 is connected, at one end to a clip that fits over the edge 18 or 20 of the board. In various exemplary embodiments, the clip 32 is attached to the body strap 30 by passing the clip 32 through a sleeve or eye-hole 34 in the body strap 30. In other embodiments, the body strap 30 is attached to the clip 32 by a rivet, a screw, adhesive(s) or any other appropriate attaching or fastening device(s) or material(s). In various exemplary embodiments, the side of the body strap 30 facing toward the fillet board 2 has the hook component 38 of a hook-and-loop fastening pair. When this exemplary embodiment of the body strap 30 is used the edge of the board 18 or 20 or other appropriate surface of the board 2 has attached to it the complementary loop component 40 of the hook and loop fastening pair. In use, the clip 32 is moved along the side of the fillet board 2 to approximately the level of the gills. The strap is then passed under the fillet board 2 and around the fish, preferably under or over the gill covering or operculum of the fish, such that the hook component 38 on the strap 30 contacts the loop component 40 on the fillet board, thereby securing the fish to the fillet board 2.

FIG. 2 illustrates one exemplary embodiment of the fillet board 2 used with a fish having horns when the body strap 30 is not in use. As shown, a spine of the pectoral fin of the fish is placed through at least one aperture 24 of the fillet board to secure the fish on the board, and the tail of the fish is secured by the tail clamp 28. In use, the fish can then be filleted as described above. A principal advantage of this fillet board 2 is that, as a fillet knife is drawn through the fish body from a location directly behind the upwardly expanded pectoral fin toward the tail end of the fish, the spine or horn of the fish which is engaged within a board aperture 24 resists rearward movement of the fish, thus facilitating an efficient cutting action of the fillet knife. After the first, exposed side of the fish is filleted, the fish is disengaged from the fillet board and turned over so that the fish horn on the filleted side is inserted through the aperture and the second side of the fish is filleted. By securing the fish in this manner the horn of the pectoral fin that is exposed projects upward providing a grip to that can be held by the person filleting the fish.

FIG. 3 illustrates a separate exemplary embodiment of the body strap 30 when the fillet board 2 is in use. In operation, a fish not having horns is placed on the top surface 4 of the fillet board 2 so that the tail of the fish can be firmly secured by the spring clamp. In the exemplary embodiment of the clip 32 shown in FIG. 3, the clip 32 is dimensioned and configured to fit snugly over the side of the side edge 18 or 20 of the fillet board 2. In this exemplary embodiment, the outer face of the clip 42 has the loop component 40 of the hook and loop fastening pair while the inner surface of the strap 30 has the hook component 38 of the hook and loop fastening pair. When this exemplary embodiment of the strap 30 is used, the clip is moved along the side of the fillet board 2 so as to be approximately level with the gills of the fish and the strap 30 is passed under the fillet board 2 and around the fish such that the strap passes either over or under the operculum of the fish. In this position, the strap is pulled taut and the hook component of the hook and loop fastening pair on the strap 30 contacts with the loop component 40 of the hook and loop fastening pair on the outer surface of the clip 32, securing the body of the fish to the board. Particularly when the strap 30 is passed beneath the operculum, the fish is effectively restrained by the strap 30 against rearward movement in response to rearward movement of the fillet knife, thereby facilitating an efficient cutting action in the same manner as the aperture engagement of a catfish horn.

In various exemplary embodiments, the outer edge 42 of the clip 32 has the corresponding loop component 40 of the hook and loop fastening pair, which has been attached to the outer edge 42 by adhesive or other appropriate fastening device and/or structures. Once the strap 30 is passed under the fillet board 2 and over the fish, the body strap 30 is pulled tight and the hook component 38 is secured to the loop component 40 of the hook-and-loop pair attached to the clip 32. Once the strap 30 is firmly secured to the clip 32, the fish can be easily filleted on the fillet board 2.

It should be appreciated that the structure for securing the body strap 30 may be an adjustable buckle, such that one end of the strap has a male component of the buckle and the other end has the female component of the buckle. In addition, while the exemplary embodiments illustrated in FIGS. 1 and 3 shows the loop component 40 of the hook and loop connector on the fillet board 2 or on the clip 32, it is equally feasible to have the loop component 40 on the opposite side of the strap 30 from the hook component 38. Similarly, while in one exemplary embodiment, the strap 30 is passed under the fillet board 2 and around the fish, it should be appreciated that the strap 30 can be passed over the fish and then Linder the fillet board 2, or the strap 30 can even be clipped to one side of the board with the strap extending over the fish to be fastened by hook and loop components to the other side of the board.

Figure 4:
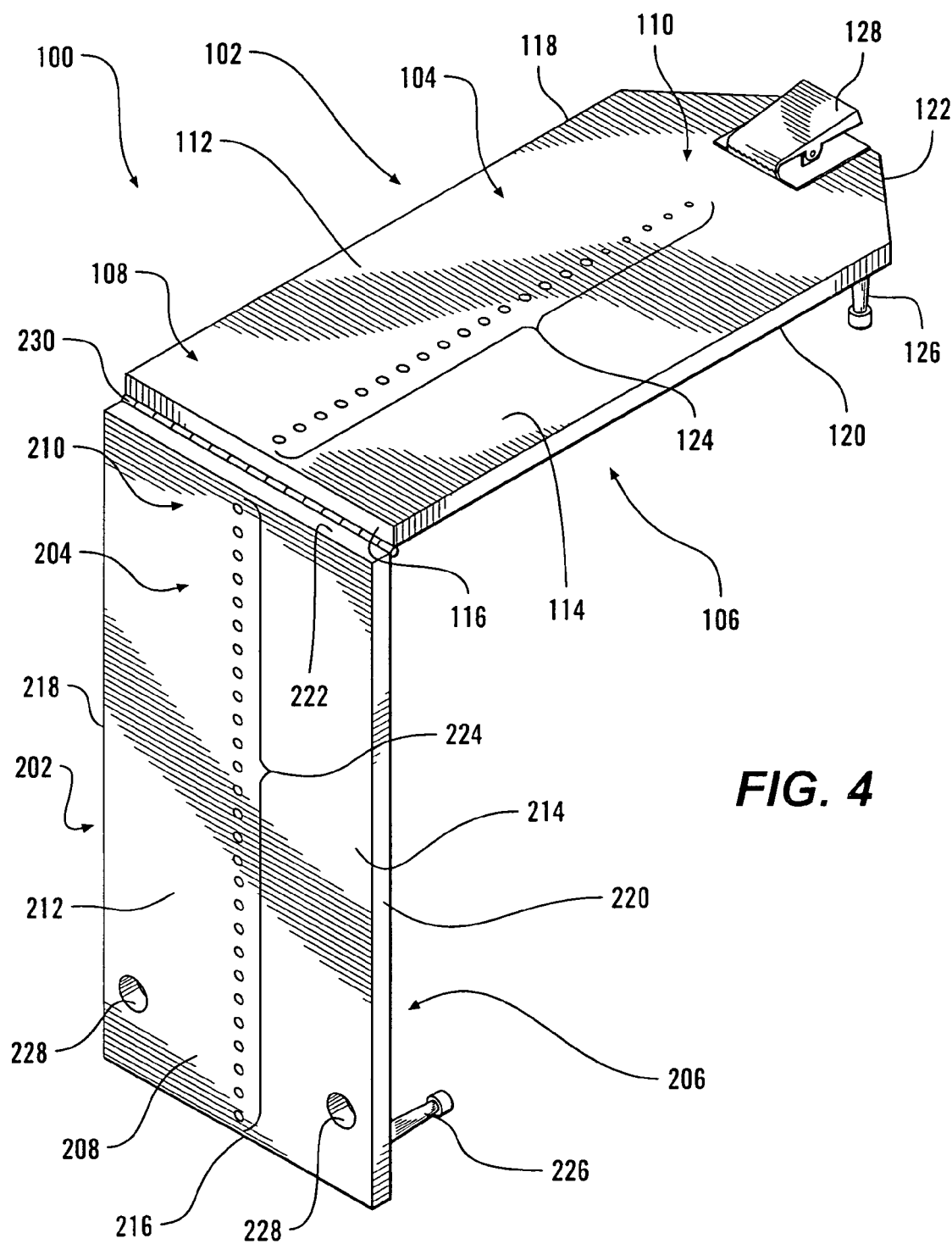
FIG. 4 is a perspective view of a second exemplary embodiment of an extendable fillet board according to this invention having an extension portion.

FIG. 4 illustrates a second exemplary embodiment of the fillet board 100 according to this invention that includes a primary portion 102 and an extension portion 202. In this extendable fillet board 100, the primary portion 102 is constructed essentially as described above, with a top surface 104, a bottom surface 106, a front end 108, a back end 110, a right side 112, a left side 114, a front edge 116, a right side edge 118, a left side edge 120, and a back edge 122. In addition, a row of apertures extend at least a portion of the length of the primary portion 124. Various exemplary embodiments of the fillet board 100 include one or more legs 126 at about the back corners of the primary portion 102 and a tail clamp 128 at about the back end 110 of the primary portion 102 of the extendable fillet board 100.

The extension portion 202 has a top surface 204, a bottom surface 206, a front end 208, a back end 210, a right side 212 and a left side 214, as well as a front edge 216, a right edge 218, a left edge 220, a back edge 222, a number of centerline apertures 224 and one or more legs 226 that are located on the front end 208 of the extension portion 202. A piano hinge 230 is secured on the bottom surface 206 of the back end 210 of the extension portion 202 and the bottom surface 106 of the front end 108 of the primary 102 portion. A number of holes 228 are located at about the front 208 sides 212 and 214 of the extension portion 202, and are dimensioned and configured and are in register with the legs 126 on the primary portion Such that, when the extendable fillet board 100 is closed at the hinges 230, the legs 126 pass through the holes 228 of the extension portion 202, allowing the bottom surface 106 of the primary portion 102 to lie flat against the bottom surface 206 of the extension portion 202. In addition, while a piano hinge 230 is used in the exemplary version of the fillet board 100 shown in FIG. 4, it should be appreciated that any other hinges can be used, such as, for example, strap hinges, leather hinges, canvas hinges or the like.

In use, should the user so desire, the folded extendable fillet board 100 is opened at the hinges 230 and at least one of the pectoral-fin spines or horns of the fish are passed through at least one of the apertures 124 of the primary portion 102 or one of the apertures 224 of the extension portion 202, allowing the fish to lie flat on the top surfaces 204 and 104 of the extendable fillet board 100 and the tail of the fish is secured by the tail clamp 128. Alternatively, when the fillet board 100 is used for a fish that does not have horns, the tail of the fish is secured by the tail clamp 128 and the body of the fish is secured by the strap 32, as described with respect to the exemplary embodiments of the fillet board 2 shown in FIGS. 1 and 3

In the exemplary embodiment shown in FIG. 4, the fillet board 100 has the apertures 224 and 124 on both the extension portion 202 and the primary portion 102, respectively. It should be appreciated that, in some exemplary embodiments, the apertures 224 on the extension portion 202 overlap the apertures 124 on the primary portion 102 such that, when folded, the apertures of the primary portion and the extension portion are co-extensive with each other. This can allow a fish horn to pass through both apertures 124 and 224 when the extension portion 202 is folded under the primary portion 102. In these exemplary embodiments, front legs (not shown) are also found at the front 108 bottom surface 106 of the primary portion 102 and oblong slots (not shown) through the sides 212 and 214 of the back end 210 of the extension portion are in register with the front legs (not shown), such that when the extendable fillet board 100 is folded at the hinges 230, the primary portion 102 is supported by legs off the underlying support surface to provide space for the fish horns projecting through the apertures 124. However, in some exemplary versions of the fillet board according to this invention there may be apertures 224 only in the extension portion 202 of the fillet board 100.

While a spring clamp 28 is used to secure one end of the fish to the fillet board in the exemplary embodiments described above, other structures or techniques can be used to secure one end of the fish in place of, or in addition to, the spring clamp 28. Such structures may include a hinged-bar bearing spikes or a screw press, for example. Similarly, while a clip bearing the body strap is described above, other structures and techniques can be used to secure the strap to the fillet board, including, but not limited to, a clamp having a thumb-screw, a U-clip which rides along the side of the fillet board 18 or 20 on a fixed bracket attached to the edge of the fillet board and the like. Thus, the exemplary embodiments described above do not preclude use of any other structures or devices to secure a fish to the fillet board.

The above-outlined exemplary embodiments of the fillet board according to this invention are usable to secure either a fish having horns or a fish that does not have horns to the surface of the fillet board for filleting such a fish. Thus, each of the various structures and methods described herein are separately useful. Therefore, it should be appreciated that fillet boards according to this invention do not need to use all or even a plurality of the various structures disclosed herein.

While this invention has been described in conjunction with the exemplary embodiment outlined above, various alternatives, modifications, variations, improvements, and/or substantial equivalents, whether known or that are or may be presently unforeseen, may become apparent to those having at least an ordinary skill in the art. Accordingly, the exemplary embodiments of the invention as set forth above are intended to be illustrative, not limiting, various changes may be made without departing from the spirit and scope of the invention. Therefore, the invention is intended to embrace all known or earlier developed alternatives, modifications variations, improvements and/or substantial equivalents.

What is claimed is:

1. A fillet board usable to fillet fish having horns extending outwardly from the sides of the fish body, comprising:
    a planar member having a continuous solid upper surface and having a back end;
    the member defining a plurality of first apertures of approximately circular cross-section passing from the upper surface downwardly through the member, and spaced linearly in a single row along at least a portion of the length of the member whereby each first aperture will be located a different distance from the member back end;
    the first apertures each having a diameter of at least ⅜ inch;
    the member further defining a plurality of second apertures of approximately circular cross-section passing from the upper surface downwardly through the member and spaced linearly in a single row along a portion of the length of the member, each second aperture having a diameter of at least ¼ inch and less than ⅜ inch and being located closer to the back end of the planar member than are the first apertures, each second aperture being located a different distance from the member back end;
    said first and second apertures being arranged substantially along at least a portion of a centerline of the member;
    said first and second apertures each being adapted to selectively receive and engage a horn of a fish so that the body of the fish is positioned flat on its side upon the substantially continuous solid upper surface of the supporting member with the tail of the fish extending substantially to the member back end, and to retain the engaged horn and the fish in a substantially fixed position on the continuous member to facilitate removal of a fillet from the upwardly exposed side of the fish, the larger first apertures being located more distant from the member back end to accommodate larger horns of longer fish than the smaller second apertures located closer to the member back end;
    a first fastening structure mounted on the back end of the planar member in substantial linear alignment with the first and second apertures for securing the tail of a fish retained on the member;
    the member being supported a sufficient distance above a support surface by a spacer element to provide clearance for an engaged fish horn to extend through any receiving first or second aperture and a substantial distance below the planar member without contacting the support surface, the spacer element comprising a plurality of legs attached to the member, which legs are adapted to be disposed upon or rest upon a support surface.

2. The fillet board of claim 1, wherein the legs will support the member a distance of three inches or more above the support surface.

3. The fillet board of claim 1, wherein the first fastening structure is a clamp.

4. The fillet board of claim 1, wherein the member comprises:
    a primary portion,
    an extension portion,
    at least a portion of the first apertures passing through the member are located on the extension portion,
    and a back end of the extension portion is hingedly connected to a front end of the primary portion.

5. A fillet board usable to fillet fish having horns extending outwardly from the sides of the fish body, comprising:
    a planar member having a continuous solid upper surface and having a back end;
    the member defining a plurality of first apertures of approximately circular cross-section passing from the upper surface downwardly through the member, and spaced linearly in a single row along at least a portion of the length of the member whereby each first aperture will be located a different distance from the member back end;
    the first apertures each having a diameter of at least ⅜ inch;
    the member further defining a plurality of second apertures of approximately circular cross-section passing from the upper surface downwardly through the member and spaced linearly in a single row along a portion of the length of the member, each second aperture having a diameter of at least ¼ inch and less than ⅜ inch and being located closer to the back end of the planar member than are the first apertures, each second aperture being located a different distance from the member back end;

said first and second apertures each being adapted to selectively receive and engage a horn of a fish to permit the body of the fish to be positioned flat on its side upon the substantially continuous solid upper surface of the member with the tail of the fish extending substantially to the member back end, and to retain the engaged horn and the fish in a substantially fixed position on the continuous member to facilitate removal of a fillet from the fish, the larger first apertures being located more distant from the member back end to accommodate larger horns of longer fish than the smaller second apertures located closer to the member back end;

a first fastening structure mounted on the back end of the planar member in substantial linear alignment with the first and second apertures for securing the tail of a fish retained on the member;

the member being supported a sufficient distance above a support surface by a spacer element to provide clearance for an engaged fish horn to extend through any receiving first or second aperture and a substantial distance below the planar member without contacting the support surface;

a second fastening structure for retaining a fish body on the planar member, the second fastening structure comprising a flexible strap wrapped around the planar member and having a first end and a second end, and at least one fastening structure for securing the strap around the planar member and any fish body placed thereon.

6. The fillet board of claim 5, wherein the strap fastening structure includes at least one component of a hook and loop fastening pair.

* * * * *